United States Patent

[11] 3,597,706

[72] Inventor Lynden U. Kibler
Middletown, N.J.
[21] Appl. No. 862,771
[22] Filed Oct. 1, 1969
[45] Patented Aug. 3, 1971
[73] Assignee Bell Telephone Laboratories, Incorporated
Murray Hill, N.J.

[54] STRIP LINE SWITCH
3 Claims, 2 Drawing Figs.

[52] U.S. Cl. .......... 333/7, 333/84 M, 317/235, 307/88.5—244, 307/88.5—259
[51] Int. Cl. .......... H01p 5/12
[50] Field of Search .......... 333/7, 84 M; 307/244, 259, 88.5—244, 88.5—259; 317/235

[56] References Cited

UNITED STATES PATENTS

| | | | |
|---|---|---|---|
| 3,008,089 | 11/1961 | Uhlir, Jr. | 317/235 X |
| 3,474,358 | 10/1969 | Geddry et al. | 333/7 |
| 3,475,700 | 10/1969 | Ertel | 333/7 |

*Primary Examiner*—Herman Karl Saalbach
*Assistant Examiner*—Saxfield Chatmon, Jr.
*Attorneys*—R. J. Guenther and E. W. Adams, Jr.

ABSTRACT: A switch for high frequency use is an integrated strip line structure wherein diodes are in shunt between the source and load and can be selectively biased to produce switching with a minimum of impedance mismatching.

PATENTED AUG 3 1971 3,597,706

INVENTOR
L. U. KIBLER
BY David P. Kelley
ATTORNEY

STRIP LINE SWITCH

BACKGROUND OF THE INVENTION

1. Field of the Invention

This invention relates to high frequency switches and, more particularly, to strip transmission line structures for switching microwave frequencies among several transmission lines.

2. Description of the Prior Art

In high frequency transmission, in general, two types of switching are used, mechanical and electronic. Mechanical switching is generally accomplished, in microwave systems, by reducing the signals to be switched to baseband frequencies and then, after switching, reconverting to the microwave frequency. In addition to being an unduly complicated method of switching, such an arrangement has the additional disadvantages of bulkiness, metal-to-metal contact, leading to wear of the parts and arcing, and high insertion loss. Electronic switching obviates many of these disadvantages, principally through the elimination of moving parts. However, such switching, the most common manifestation being diode switches, has its own inherent disadvantages. The diodes themselves because of necessary packaging introduce complex impedance into the circuit with attendant mismatches and increase in insertion loss. In prior art devices, these disadvantages are overcome at least to some extent, by the addition of filter circuits. However, where, as in much of present day technology, the object is miniaturization, the addition of filter networks or other compensating devices increases the size of the circuit element, thereby defeating the aim of small size.

SUMMARY OF THE INVENTION

The present invention is an electronic switch for use at microwave frequencies which does not require reductions in operating frequency, nor does it necessitate the use of a filter or impedance matching circuits.

In an illustrative embodiment of the invention, a member of intrinsic, semiconductor material is covered on one surface thereof with a conductive coating, forming a ground plane. The opposite surface of the member has a plurality of conductive strips radiating outward from a center conducting element. The strips are separated from the center member by a DC blocking gap. Formed within the member, and in ohmic contact with each of the conducting strips, are a plurality of *p+* type conductivity zones. Each zone contacts its associated strip at a point approximately one-quarter of a wavelength at the operating frequency from the center member.

Diametrically opposite each of the *p+* regions in the material is an *n+* region, in contact with the ground plane member, thereby forming a plurality of diodes between the conducting strips and the ground plane.

In operation any of the strips may function as the input to the switch. Switching is accomplished by forward biasing one or more diodes, producing a short circuit of a fraction of an ohm at that terminal. This shorts out the load impedance at each terminal and produces, because of the quarter wavelength line, an open circuit to the input. The remaining diodes are reverse biased creating an open circuit shunted by a small capacitance at the terminal. Since each strip has a characteristic impedance equal to the load impedance, the terminal load impedance is seen directly by the input terminal. The approximate quarter wavelength line acts in this case to cancel the effect of the small diode capacitance.

It is a feature of the present invention that the diodes being integrated into the strip line structure present very small impedance differences from the open or short condition. Impedance matching can be simply taken care of by slight adjustments in the length of the quarter wave strip lines. This feature eliminates the necessity of complex filter structures to compensate for the complex impedances of the diode case structure now used.

The various features and advantages of the present invention will be more readily apparent from the following detailed description, read in conjunction with the accompanying drawings, in which:

FIG. 1 is a plan view of a switch arrangement embodying the principles of the present invention; and FIG. 2 is a sectional view along the line A–A of FIG. 1.

DETAILED DESCRIPTION

Figure 1:
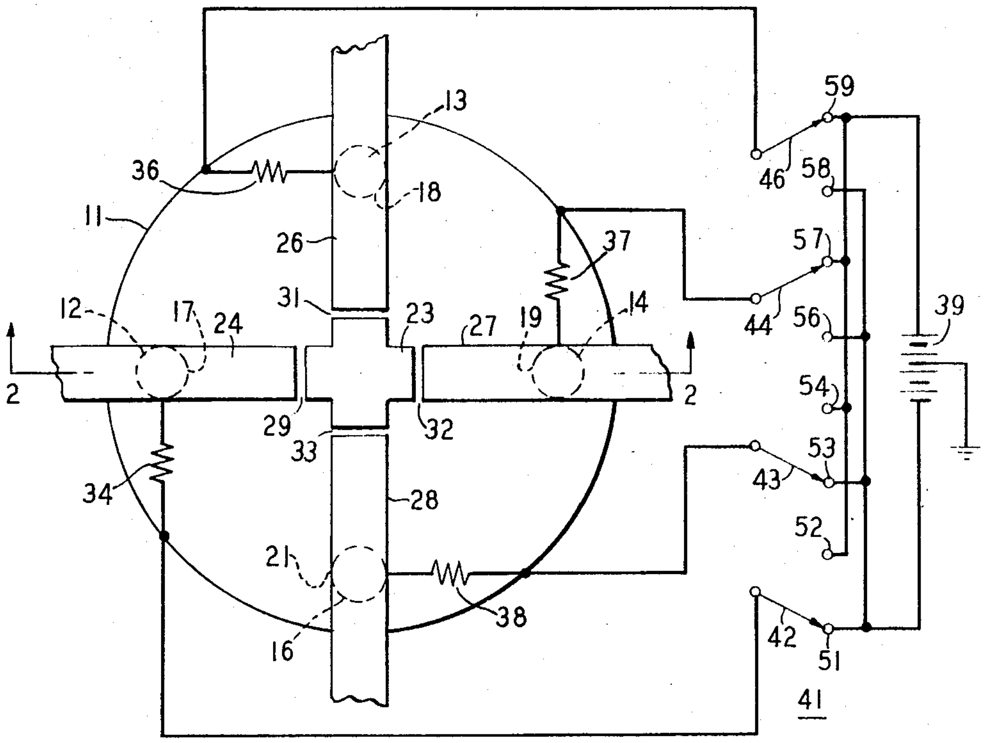
Figure 2:
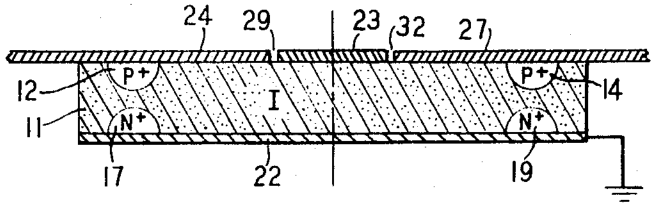

The switch of FIG. 1 comprises a disk 11 of intrinsic semiconductor material, such as, for example, silicon or other suitable material, e.g. gallium arsenide or germanium. At four areas in the disk four *p-i-n* diodes are formed by *p+* regions 12, 13, 14, and 16 and *n+* regions 17, 18, 19, and 21 disposed opposite each other, as best seen in FIG. 2. For a conductivity of $10^{14}$ carriers and resistivity of 100 ohm-centimeters for the intrinsic region, the *p+* regions may be formed by localized doping of the silicon with boron or aluminum to give approximately $10^{18}$ carriers per $cm.^3$ and the *n+* regions may be formed by doping with arsenic or antimony to give $10^{18}$ donors per $cm^3$.

As shown in FIG. 2, the surface of disk 11 adjacent the *n+* regions is covered or coated, as by evaporization, with a conducting layer 22 which is in ohmic contact with the *n+* regions. Layer 22 forms the ground plane for the strip line configuration of the embodiment of FIG. 1.

The surface adjacent the *p+* regions has deposited thereon a center conducting member 23 and four radial conducting arms 24, 26, 27, and 28. The arms or strips 24, 26, 27, and 28 are separated from member 23 by DC blocking gaps 29, 31, 32, and 33. These gaps need only constitute a break in conductivity and hence are only a few microns wide. The strips 24, 26, 27, and 28 are in ohmic contact with *p+* regions 12, 13, 14, and 16, respectively, and the strips are approximately one-quarter wavelength long at the center of the operating frequency band from the *p+* region to member 23, thereby functioning to impedance match with the load, not shown.

Bias connections to each of the *p+* regions are made through strip line inductors 34, 36, 37, and 38 which are deposited on the surface of member 11 by evaporation or other suitable techniques. A source 39 of bias voltage is connected, through a switching arrangement 41, to each of the inductors 34, 36, 37, and 38. Switching arrangement 41 is a schematic representation of any number of possible switching arrangements which selectively forward or reverse bias each of the diodes independently of the others. Inductors 34, 36, 37, and 38 are connected to switch toggles 42, 46, 44, and 43, respectively. The toggles are either connected to the negative side of the source 39 through contacts 51, 53, 56, and 58, or to the positive side through contacts 52, 54, 57, and 59.

In operation, consider that strip 24 is the input terminal to the switch. In such case, the diode associated with strip 24, formed by regions 12 and 17, is reverse biased, as shown. For purposes of illustration, consider that the input energy is to be switched to strip 28. In this case, the diode associated with strip 28, formed by regions 16 and 21, is reverse biased, while the diodes associated with strips 26 and 27 are forward biased, as shown in FIG. 1. The low impedance condition at the diodes of strips 26 and 27 effectively shorts out the terminal impedance and on transformation by the quarter wavelength length of each of the strips to approximately an open circuit condition at the center 23, no energy is directed along strips 26 and 27. On the other hand, the high impedance condition of the diode associated with strip 28 allows strip 28 to be terminated in its terminal impedance which equals the characteristic impedance of strip 28 and the energy from strip 24 is directed to strip 28.

The diodes dissipate only a small fraction of the energy to be switched, since the diodes are open or shorted although the state of the diodes governs the switching function.

The foregoing discussion has been for purposes of illustration only. The principles of the invention have been shown as they relate to a four terminal switch. It will be readily apparent that a larger or smaller number of terminals might be used, as well as different configurations of the switch itself. Numerous embodiments of the principles of the invention may occur to workers in the art without departure from the spirit and scope of the invention.

I claim:

1. A switch for use in high frequency systems comprising a member of intrinsic semiconductor material having first and second opposed surfaces, a conductive layer on one of said surfaces, a centrally located conducting member on the other of said surfaces, a plurality of conducting strips on said other of said surfaces, each of said strips being separated from said conducting member by a direct current blocking gap, a plurality of *p*-conductivity type regions in said member, each of said strips being in conductive contact with a *p*-region, each of said strips being approximately one-quarter wavelength long at the operating frequency of said switch, a plurality of *n*-conductivity type regions in said member in conductive contact with said conductive layer and forming a plurality of *p-i-n* diodes with said *p*-type regions.

2. A switch as claimed in claim 1 wherein said member is of silicon.

3. A switch as claimed in claim 1 and further including means for selectively forward and reverse biasing the *p-i-n* diodes.